United States Patent
Froehlich

(10) Patent No.: US 8,720,639 B2
(45) Date of Patent: May 13, 2014

(54) NOISE REDUCTION ROLLING BEARING FOR POWER STEERING

(75) Inventor: Stefan Froehlich, Zimmerbach (DE)

(73) Assignee: ZF Lenksysteme GmbH, Schwaebisch Gmuend (DE)

( * ) Notice: Subject to any disclaimer, the term of this patent is extended or adjusted under 35 U.S.C. 154(b) by 0 days.

(21) Appl. No.: 13/589,644

(22) Filed: Aug. 20, 2012

(65) Prior Publication Data

US 2013/0206498 A1    Aug. 15, 2013

Related U.S. Application Data

(63) Continuation of application No. PCT/EP2011/053507, filed on Mar. 9, 2011.

(30) Foreign Application Priority Data

Mar. 17, 2010    (DE) .................... 10 2010 002 958

(51) Int. Cl.
    *B62D 5/04*        (2006.01)
    *F16C 25/08*       (2006.01)

(52) U.S. Cl.
    USPC ............................ 180/444; 384/493; 384/517

(58) Field of Classification Search
    USPC .......... 180/443, 444; 384/493, 499, 500, 517, 384/518, 905; 74/388 PS
    See application file for complete search history.

(56) References Cited

U.S. PATENT DOCUMENTS

| | | | |
|---|---|---|---|
| 6,763,738 B1 * | 7/2004 | Tsutsui et al. ............. | 74/388 PS |
| 8,443,929 B2 * | 5/2013 | Suzuki et al. ................. | 180/444 |
| 8,459,402 B2 * | 6/2013 | Hamakita et al. ............. | 180/444 |
| 2010/0319475 A1 | 12/2010 | Fuechsel | |

FOREIGN PATENT DOCUMENTS

| | | |
|---|---|---|
| DE | 42 31 272 | 3/1994 |
| DE | 103 10 492 | 9/2004 |
| JP | 4-25025 | 2/1992 |
| JP | 2009-079696 | 4/2009 |
| WO | WO-2009/109357 | 11/2009 |

* cited by examiner

*Primary Examiner* — Tony Winner
(74) *Attorney, Agent, or Firm* — Jordan and Hamburg LLP

(57) ABSTRACT

In an electric auxiliary power steering system a rotating component driven by a servomotor includes a rolling bearing for axially and radially supporting the component. At least one inner race or one outer race of the rolling bearing is split into two race parts along a parting plane that runs approximately perpendicular to a longitudinal axis of the rotating component. The two parts are axially spring-loaded against one another. The ends of the race parts facing one another are aligned at an angle from the radial outer side thereof to the radial inner side thereof. The element with a conical cross section and having a higher coefficient of thermal expansion than the coefficient of thermal expansion of the outer ring or the inner ring is placed between the ends so that when heat is introduced, the element expands and the race parts are able to move toward one another. When the element cools the race parts can move apart axially.

15 Claims, 2 Drawing Sheets

NOISE REDUCTION ROLLING BEARING FOR POWER STEERING

This is a Continuation of U.S. National Stage of PCT/EP2011/053507 Filed Mar. 9, 2011.

BACKGROUND OF THE INVENTION

The invention relates to a power steering system, in particular an electric auxiliary power steering system for a vehicle, comprising a rotating component driven by a servomotor.

DE 103 10 492 A1 shows and describes an electric power steering system, wherein a servomotor drives an axially shifting element, the ball screw of which engages with a female thread of an axially fixed nut held in a frame. The nut and a belt pulley of a traction gear are non-rotatably fixed between the servomotor and the moving screw so formed. The nut is supported and mounted at the frame by way of a radial fixed bearing. The radial bearing is designed as a rolling bearing and in particular is designed as a four-point bearing since axial forces in particular must also be absorbed.

The extent of play of the four-point bearing and the chatter of the bearing caused by rapidly changing axial forces on the bearing races and rolling elements during operation of the power steering system are reduced through suitable measures.

In power steering systems, there are also known rotating components, which are supported by rolling bearings, wherein the rolling bearing must absorb axial forces, such as in the support of a steering nut of a steering column gear.

However, the rapidly changing axial forces that act on the bearing races of a rolling bearing of this kind, that occur during the operation of such power steering systems cause changes in the amount of play in the rolling bearing, in particular due to different degree of heating of the bearing races of the rolling bearing at the beginning of operation of the power steering system. Under some circumstances, these changes in play can cause occasional chatter at the beginning of operation of a power steering system, until the operational play specified by design is ultimately established as a result of even heating of the components of the rolling bearing. At low operating temperatures, the bearing play is detrimental to bearing friction.

The known roller bearing designs are not always able to prevent noise during this operational phase in the special application of a power steering system.

SUMMARY OF THE INVENTION

The object of the invention is to provide a power steering system, the operating noise of which and the friction of which are minimized.

By splitting an outer race or an inner race of the rolling bearing into two race halves or race parts along a parting plane that runs approximately perpendicular to a longitudinal axis of the axially rotating component, the two halves or parts being axially spring-loaded against one another, wherein the ends of the race halves facing one another face one another at an angle from the radial outside to the radial inside thereof, and an element with a conical cross section with a higher coefficient of thermal expansion than the coefficient of thermal expansion of the outer race or the inner race is disposed between the ends, it becomes possible to adjust the rolling bearing and the bearing play thereof to the current operating temperature, and to maintain a constant bearing play over the operating temperature range. The component with a higher coefficient of thermal expansion, because of the wedge-shaped cross section thereof, which narrows toward the center of the rolling bearing, is able to drift outward in the direction of a bearing nest during expansion and during shrinkage to move radially toward the center of the rolling bearing due to the cooling effect. During an expansion of the component with a higher coefficient of thermal expansion, the race halves are moved toward one another due to the spring-loading thereof. This causes the sides of the bearing groove in the race halves to move toward the rolling elements of the rolling bearing and the bearing play is readjusted to the higher bearing temperature. In shrinkage of the component with higher coefficient of thermal expansion induced by cold, the race halves drift apart axially and the bearing play is adjusted to the lower temperatures.

In a particularly preferred embodiment example, the rotating component driven by the servomotor is a nut supported in the frame and for the most part axially fixed, the nut forming a moving screw together with an axially movable component with threads that engage with the female threads of the nut and being supported by the rolling bearing in the frame.

One or more spring elements can spring-load the race halves against one another.

It has been shown that undesired bearing play can arise in a steering gear of the class mentioned in rolling bearings with un-split bearing races in certain situations, if the outer race of the rolling bearing is heated first in sequence due to thermal conduction from an internal combustion engine at a frame or housing of the power steering system, followed by the heating of the inner race. In the process, the outer race widens such that the shoulders move radially away from the longitudinal axis of the bearing. It is therefore helpful to, for one thing, split the outer race in the radial direction into two race halves or parts and to arrange the element with a higher coefficient of thermal expansion between the race halves as a ring with a conically-shaped or truncated cone-shaped cross section. The conical angle at each flank of the element is preferred to be selected at between about 5° and 50°. The radial expansion that the ring-shaped element with a higher coefficient of thermal expansion makes depends on its dimensions. The geometric size of the element depends on the total size and the operating temperatures in effect at the location of installation thereof. The inner radius of the element is selected to be larger than the largest inner radius of the outer race so that the element can expand radially without coming into contact with the rolling elements or with a support surface of the outer periphery of the outer race. Obviously, the same relationships apply for an element with higher coefficient of thermal expansion provided at an inner race. A radial motion of the ring-shaped element is possible either by dimensioning the ring-shaped element and/or by making suitable grooves in the frame.

The coefficient of thermal expansion $\alpha_B$ of the element is preferred to lie between the expansion coefficients of steel and aluminum, in other words between about $16 \times 10^{-6} K^{-1}$ and $16 \times 10^{-6} k^{-1}$. It is preferred for a material such as aluminum or brass to be used for the manufacture of the element.

The two race halves are preferred to be spring-loaded using spring elements that act in opposite directions toward one another in the axial direction. The spring elements can be made of an elastomeric material or can be designed as steel springs in a variety of designs, such as ondular washers, disc springs or compression springs, placed at a distance from one another about the lateral periphery of the ring halves. The compression springs are supported between the frame or a component fixed thereto, which form the bearing nest, and the ends of the race halves of the outer or inner race.

It can also be useful to design the spring element as a spring clip or a plurality of such spring elements that axially reach around the race halves or pass therethrough in openings therein. The outer race or inner race is preferred to have a symmetrical cross section relative to the radial parting plane.

It is useful to make the rolling bearing a ball bearing, in particular a deep groove ball bearing. The ball bearing can be one or two tracks, or can be designed as a four point bearing or made up of two tapered ball bearings. The axially movable element is designed as a spindle or a threaded section of a rack. The axially movable element can be connected to steerable wheels of a motor vehicle in a known manner by way of tie rods and wheel steering levers. The threaded section or the spindle works together with the nut to be supported, wherein the moving screw so formed is part of a steering gear of an electrical or hydraulic auxiliary power steering system or foreign power steering. The frame is depicted as a steering gear housing forming a single unit for a ball-and-nut spindle gear or ball-and-nut hydraulic gear shown.

It is preferable for the servomotor to be controlled as an electric motor in pulse width modulation mode and for the longitudinal axis thereof to be parallel to the rack or spindle, so that the power steering system is preferably formed as an axially-parallel electric power steering system.

The motor shaft of the electric motor is non-rotatably fixed to a belt pulley. A belt that runs thereon is also tensioned by way of a belt pulley on or at the nut. The two belt pulleys form a self-tensioning traction gear. The belt can be designed as a toothed belt. There can also be a combination of two different types of belts installed in the traction gear. Instead of a self-tensioning traction gear, the servomotor can be made to be movable relative to the longitudinal axis of the axially-movable element and relative to the nut.

The invention is now described in more detail using an exemplary embodiment and presented with the aid of the drawings

DESCRIPTION OF THE PREFERRED EMBODIMENTS

Figure 1:
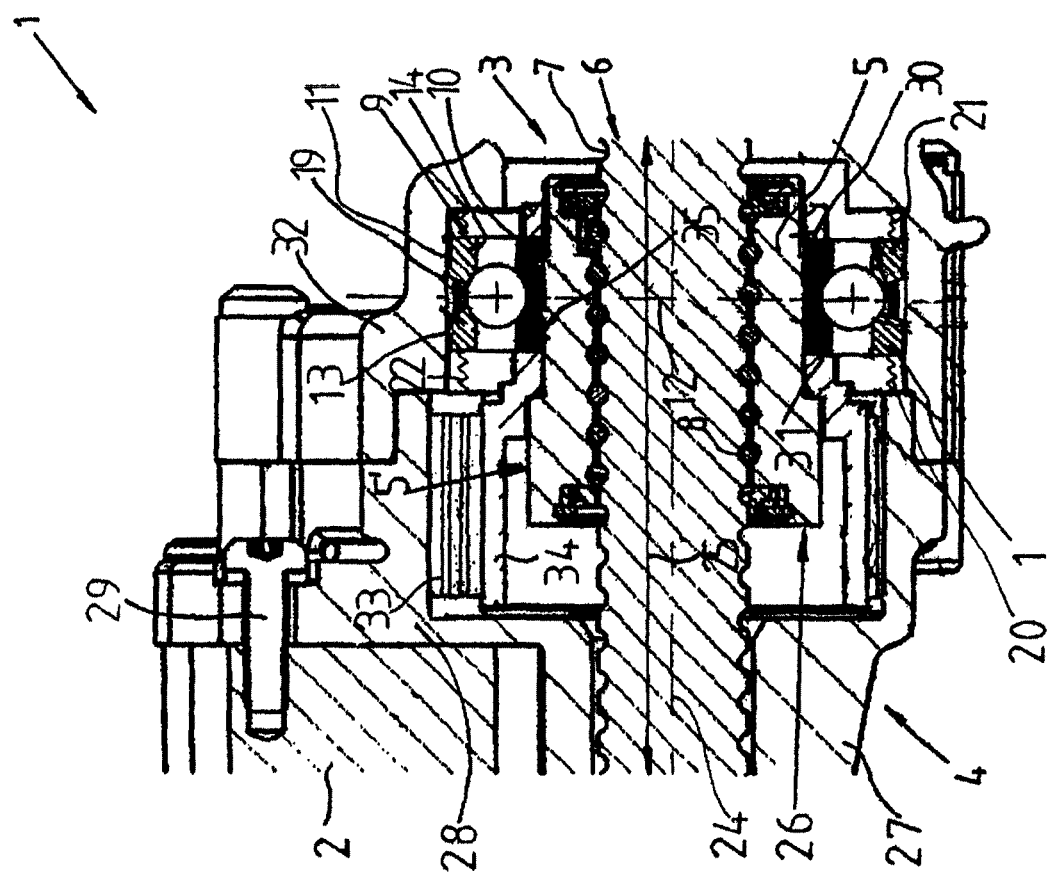
FIG. 1, is a partial longitudinal section through a power steering system according to the invention.

Shown in FIG. 1 is a partial longitudinal section through a power steering system 1 for a personal motor vehicle, the system being designed as an electrical auxiliary power steering system. Essential components of the power steering system 1 include a high pressure die cast aluminum frame 4 formed as a closed steering gear housing 27. The steering gear housing 27 comprises a radial flange 28 to which an electric servomotor 2 is attached by way of screw bolts 29. The electric servomotor 2 serves to impart an auxiliary steering force to a thread section 25 of a toothed rack 24. The toothed rack 24 represents an axially movable element 6 in the steering gear housing 27. Fastened at axial ends (not shown) of the toothed rack 24 are hinged tie rods that, along with wheel steering levers of steered wheels of the personal motor vehicle, serve to adjust the steering angle of the wheels when the toothed rack 24 is shifted axially.

The threads 7 of the threaded section 25 of the toothed rack 24 engage with female threads 8 of a rotating component 5' formed as a nut 5. The nut 5 is formed as a ball nut 26 or a recirculating ball nut. A moving screw 3 driven by the electric servomotor 2 is created by this arrangement. The ball nut 26 is rotatably supported about the threaded section 25 in frame 4, but is for the most part fixed axially. The ball nut 26 is held axially and radially using a bearing race that is formed as an inner race 10 and a bearing race that is formed as an outer race 11 of a rolling bearing 9 in the frame 4 or steering gear housing 27. The rolling bearing 9 is formed as a ball bearing 23. The inner race 10 of the rolling bearing 9 is held between two stops 30, 31 in a housing cover 32 of the steering gear housing 27. The electric servomotor 2 is functionally connected to the nut 5 via a traction gear, wherein a belt 33 formed as a toothed belt runs on a belt pulley 34 at the nut 5. The belt pulley 34 is designed like a stepped cylindrical sleeve, and the end 35 of the pulley facing the rolling bearing 9 constitutes the stop 31 for the inner race 10. The belt 33 also runs along a belt pulley which is not shown, the pulley being non-rotatably fixed to a motor shaft of the electric servomotor 2.

The servomotor 2 is controlled by a control and/or regulation system (not shown) according to sensor signals that depict a desired steering angle and a wheel steering angle. This causes the nut to rotate in one direction or the other and the toothed rack 24 is shifted in one direction or the other. On the other hand, axial forces derived from the wheel reaction forces are transferred to the nut 5. In addition, when steering motions are made by hand at the steering wheel in one direction or the other, alternating axial forces result at the nut 5, which act on the rolling bearing 9. At the beginning of operation, the outer race 11 of the rolling bearing 9 heats up since heat in general first radiates onto the steering gear housing 27 and the housing cover 32 from the outside from an engine compartment in which the steering gear housing 27 is mounted.

Figure 2:
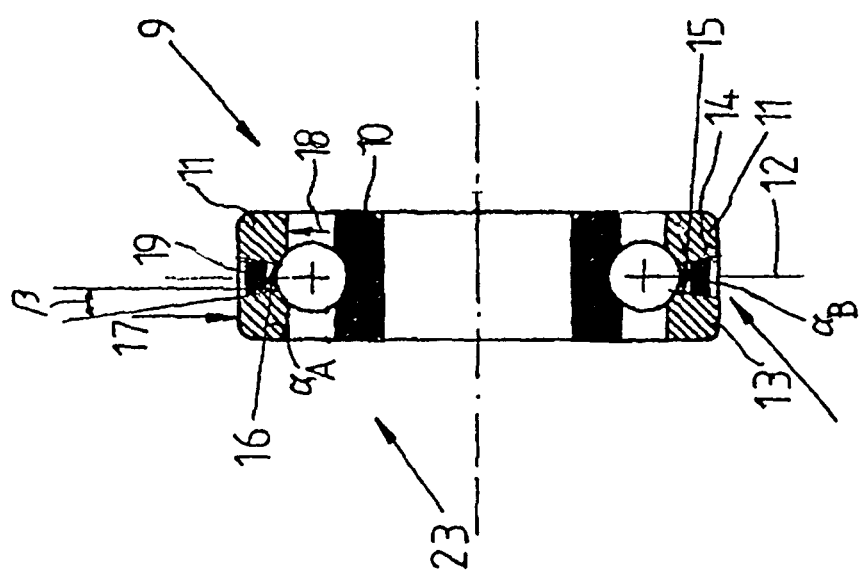
FIG. 2, is a schematic cross section through a rolling bearing for the nut of the power steering system in FIG. 1, not to scale.

As shown in FIG. 2, in particular, the outer race 11 is split into two race halves 13, 14 along a parting plane 12 that runs centrally in the radial direction of the rolling bearing 9, the race halves being formed symmetrical with respect to this parting plane 12. Here, instead of each of the ends 15,16 of the race halves 13,14 facing the parting plane 12 being run parallel to the parting plane 12, the ends 15,16 are run from the outside 17, as seen in the radial direction of the rolling bearing 9, to the inside 18 at an angle β relative to the parting plane 12. This creates a ring-shaped gap with a conical or truncated cone-shaped cross section between the race halves 13, 14. This gap is partially filled in by an element 19, which is also ring-shaped and has a higher coefficient of thermal expansion $\alpha_B$ (similar to that of aluminum) than the coefficient of thermal expansion $\alpha_A$ of the outer race and the inner race, the filling being such that the element maintains a radial distance to the outside and inside of the bearing or to the outside 17 and inside 18 of the outer race 11. These radially smaller dimensions of element 19 are required since element 19 expands or contracts considerably more in the radial direction from heating or cooling effects. In the radial movement of element 19 to this effect, the two race halves 13,14 are moved apart in the axial direction (when element 19 contracts under the effect of cooling) and together (when elements 19 expands under the effect of heat).

The race halves 13,14 are spring-loaded against one another by way of spring elements 20, 21 designed as compression springs 22. To this end, the spring elements 20, 21, which are disposed around the entire periphery of the rolling bearing 9 at equal tangential separations, are supported between stops 30, 31 and the respective race halves and the axial ends thereof.

The design of the rolling bearing 9 according to the invention allows a bearing play that is always even and prevents noise generation and friction in the rolling bearing 9, since thermal expansions of the rolling bearing 9 have no effect on the tolerances thereof during operation since these thermal expansions are compensated.

The invention claimed is:

1. An electric auxiliary power steering system for a vehicle, comprising:
   a rotating component driven by a servomotor in a frame; and
   a rolling bearing for axially and radially supporting the component in the frame, the rolling bearing having an inner race and an outer race; and
   wherein the outer race of the rolling bearing is divided into two race parts along a parting plane extending approximately perpendicular to a longitudinal axis of the rotating component;
   wherein said race parts are axially spring-loaded against one another, and the ends of the race parts facing one another are aligned at an angle from the radial outer side thereof to the radial inner side, thereof;
   wherein an element with a conical cross section is disposed between the ends of the race parts, the element having a higher coefficient of thermal expansion than the coefficient of thermal expansion of the outer race or the inner race; and
   wherein, when heat is introduced, the element expands radially such that the race parts are moved axially toward one another, and such that during cooling, the element shrinks radially and the race parts move apart axially.

2. A power steering system according to claim 1, wherein the power steering system is an electric auxiliary power steering system with an axially parallel arrangement of the servomotor and of the axially movable element.

3. A power steering system according to claim 1, wherein the race parts are spring-loaded against one another by at least one spring element.

4. A power steering system according to claim 1, wherein the element with a conical cross section has a ring-shaped shape.

5. A power steering system according to claim 1, wherein the element with a conical cross section has a coefficient of thermal expansion of between about $26 \times 10^{-6} K^{-1}$ and $16 \times 10^{-6} K^{-1}$ at about 100° C.

6. A power steering system according to claim wherein the angle is greater than 5°.

7. A power steering system according to claim 1, wherein the element with a conical cross section is made of aluminum or brass, or one of the alloys thereof.

8. A power steering system according to claim 1, wherein both race parts are spring-loaded by spring elements that act in opposite directions toward one another.

9. A power steering system according to claim 8, wherein the spring elements are made of an elastomeric material.

10. A power steering system according to claim 8, wherein the spring elements are disc springs, ondular washers, or compression springs that are supported between the frame, or a component fixed to the frame, and the race halves at distances to one another along the periphery around the race parts.

11. A power steering system according to claim 8, wherein one the spring element or a plurality of spring elements axially penetrate or reach around the two race halves and applies an axial pulling force that pulls the two race halves against one another.

12. A power steering system according to claim 1, wherein the inner race and the outer race of the rolling bearing have asymmetric cross section relative to the parting plane.

13. A power steering system according to claim 1, wherein the rolling bearing is a ball bearing, a deep groove ball bearing or a four-point bearing or two tapered ball bearings.

14. A power steering system according to claim 1, wherein the component is a nut that is mostly axially fixed in the frame, the nut creating a moving screw together with an axially movable element with threads that engage with female threads of the nut and being supported by the rolling bearing in the frame.

15. A power steering system according to claim 14, wherein the axially movable element is a spindle or a rack with a threaded section, about which an axially fixed ball nut rotates.

* * * * *